C. B. VAN HORN.
BARREL WASHING MACHINE.
APPLICATION FILED OCT. 3, 1914.

1,244,392.

Patented Oct. 23, 1917.
5 SHEETS—SHEET 5.

Witnesses
Hugh H. Ott
C. C. Hines

Inventor
Charles B. Van Horn
By Victor J. Evans
Attorney

UNITED STATES PATENT OFFICE.

CHARLES B. VAN HORN, OF PHILADELPHIA, PENNSYLVANIA.

BARREL-WASHING MACHINE.

1,244,392.　　　　Specification of Letters Patent.　　Patented Oct. 23, 1917.

Original application filed July 24, 1913, Serial No. 780,975. Divided and this application filed October 3, 1914. Serial No. 864,830.

*To all whom it may concern:*

Be it known that I, CHARLES B. VAN HORN, a citizen of the United States, residing at Philadelphia, in the county of Philadelphia and State of Pennsylvania, have invented new and useful Improvements in Barrel-Washing Machines, of which the following is a specification.

My invention relates to an apparatus for the washing of barrels, kegs, and similar containers, and more particularly adapted for use with beer kegs which must be cleansed externally as well as internally.

The present application is a division of my prior application filed July 24, 1913, Ser. No. 780,975, comprehending a structure having a centrally disposed carriage to which upward, forward, downward and rearward movements are successively imparted and which serves as a support and conveyer for the barrels or kegs; said carriage receiving the same from a suitable runway and transferring them successively to various points in the apparatus where they will receive, first, an internal and external washing with hot water; second, an external scrubbing, and third, an internal washing with cold water. The operation of the apparatus is carried on automatically by means of suitable gearing and a cam element driven from a single power shaft which constantly rotates in one direction. My invention includes further a brush carrying frame which is lowered simultaneously with the downward movement of the conveying carrier; the barrels being left at some distance above the level of said carrier so as to engage the brushes when the frame carrying said brushes is in the lower position.

The claims of the present application relate particularly to the scrubbing mechanism hereinafter fully described and shown in the accompanying drawings, in which:—

Fig. 12 is a plan view showing the means for adjusting the bilge brushes.

Figures 1, 6, 7:
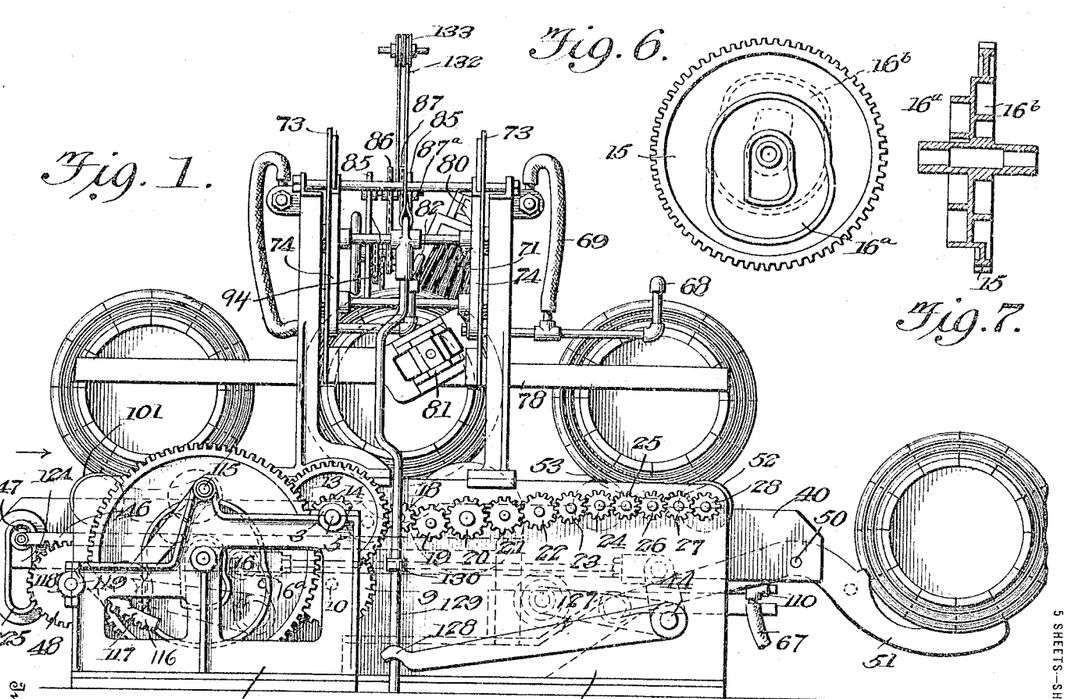
Figure 1 is a side elevation of a barrel machine having and containing the improvements forming the subject of my invention.
Fig. 6 is a side elevation of the double cam gear of the drive gearing.
Fig. 7 is a sectional view thereof.
Figure 2:
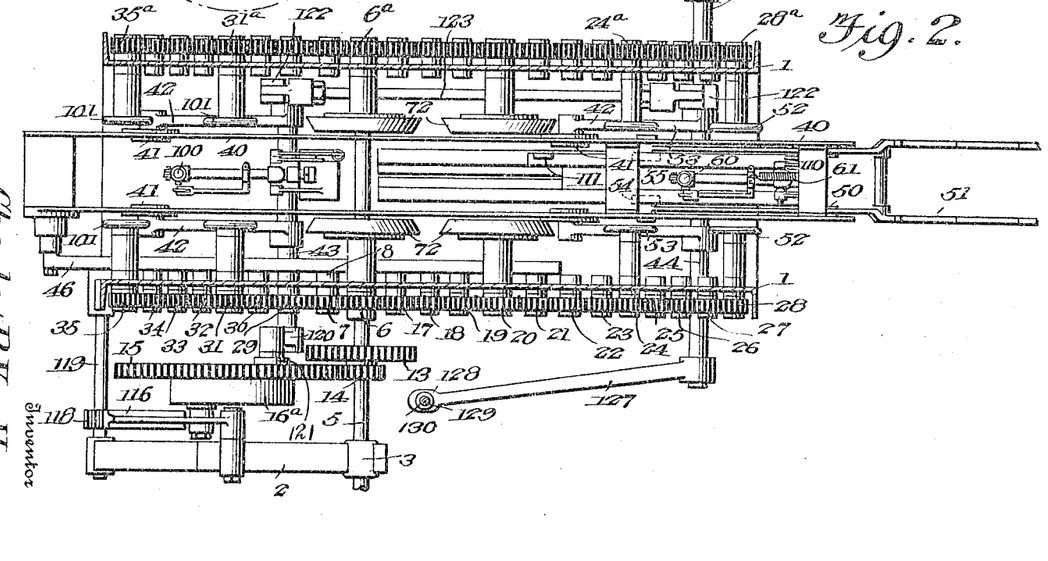
Fig. 2 is a sectional plan view of the same.
Figure 3:
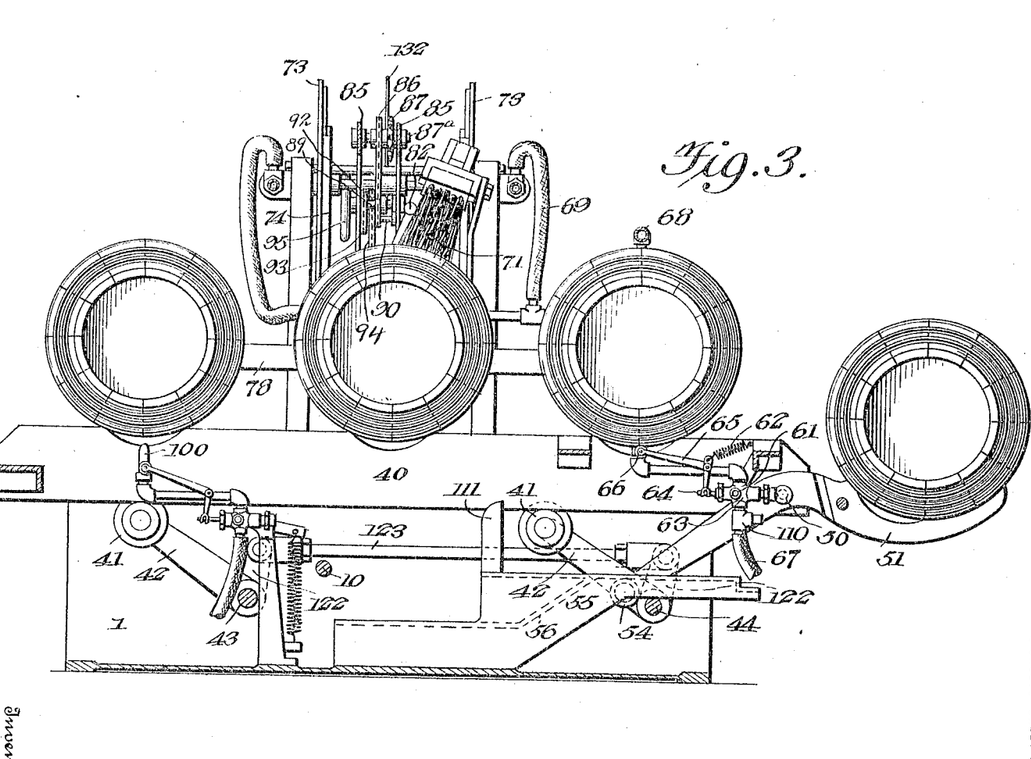
Fig. 3 is a longitudinal sectional elevation, showing the mechanism in one position.
Figure 4:
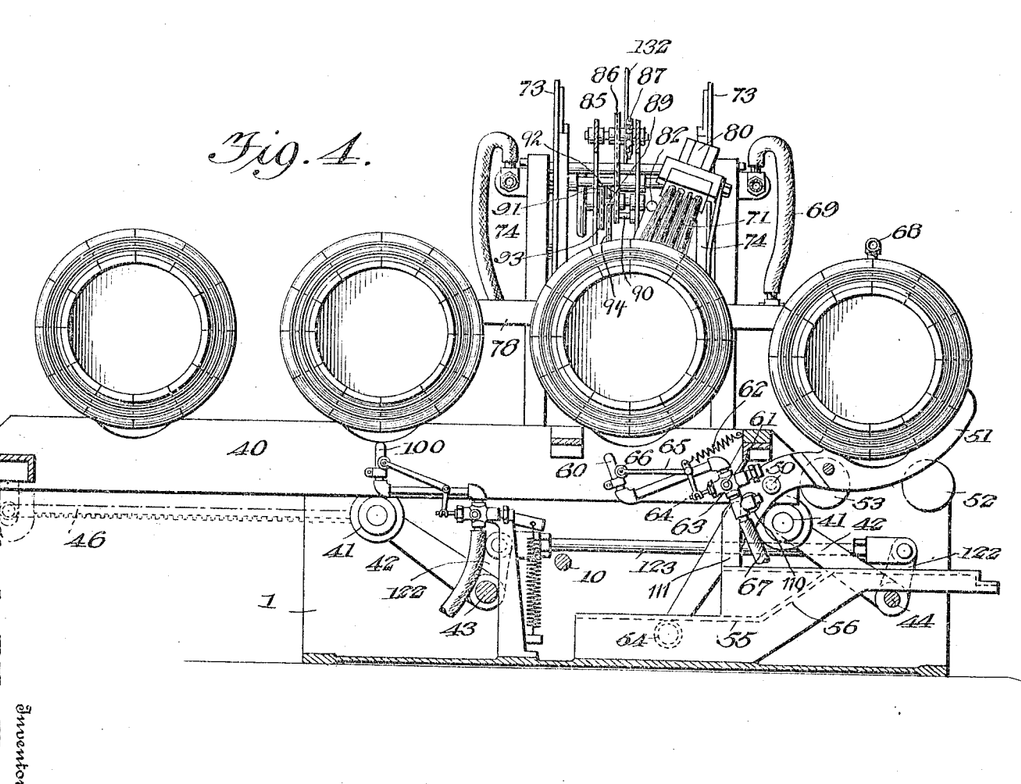
Fig. 4 is a similar sectional view showing the mechanism in another position.
Figure 5:
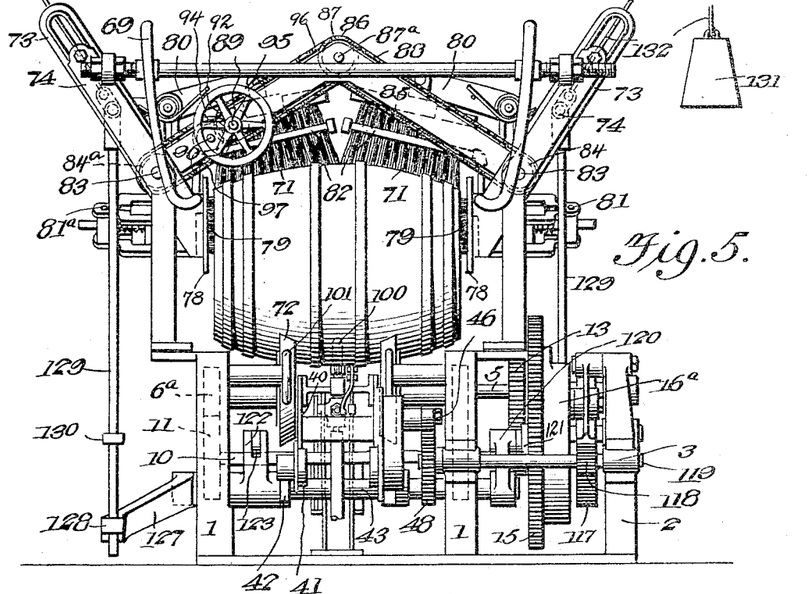
Fig. 5 is a front elevation of the machine.
Figure 8:
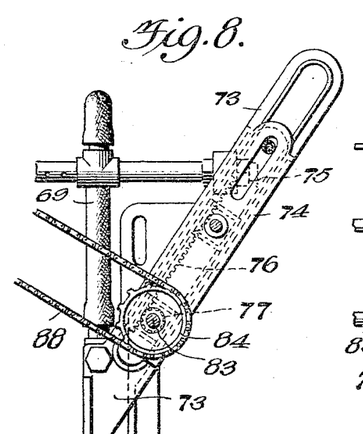
Figs. 8, 9 and 10 are enlarged views illustrating details of my invention.
Figure 9:
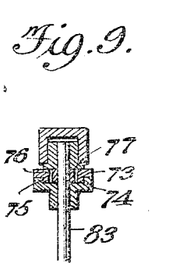
Figure 10:
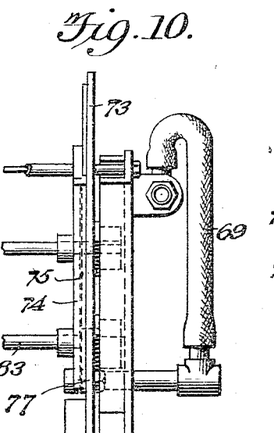
Figure 11:
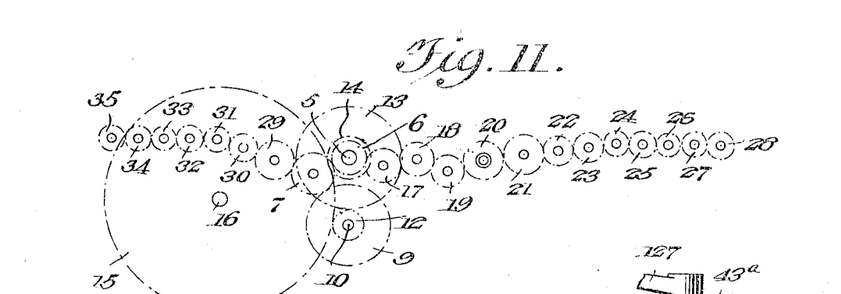
Fig. 11 is a diagrammatic view of a train of drive gearing.

In the accompanying drawings, 1, 1 represent the side frames which serve as supporting means for the various parts of the structure, and 2 is an auxiliary frame in which are formed bearings or journals 3 for the several shafts transmitting the desired movements to the various parts of the machine.

The main driving shaft to which suitable power may be applied, is indicated at 5, and carries a pinion 6, meshing with a pinion 7, mounted upon a suitable stud or spindle 8, carried by the frame 1, which pinion 7 in turn drives a gear wheel 9 on a shaft 10 disposed below the shaft 5 and extending across the machine; the opposite end of said shaft being provided with a gear wheel 11 for a purpose hereinafter described. Driven with the gear wheel 9 is a pinion 12 meshing with a gear wheel 13 loose on the shaft 5, and driven with said gear wheel 13 is a pinion 14 driving a gear wheel 15 mounted on a short shaft or spindle 16 journaled on the frame 2, with which gear wheel 15 is combined, preferably integral therewith, a pair of camming elements 16$^a$ and 16$^b$, which camming elements operate certain portions of the apparatus in a manner hereinafter described.

The pinion 6 may serve to drive two trains of gears comprising pinions 17, 18, 19, 20, 21, 22, 23, 24, 25, 26, 27 and 28, extending in one direction from said pinion 6, and pinions 7, 29, 30, 31, 32, 33, 34 and 35, extending in the opposite direction from said pinion 6. Similar trains of gears are disposed at the opposite side of the frame which are driven from a pinion 6$^a$ in mesh with the gear wheel 11 on the opposite end of the shaft 10.

Disposed within the side frames is a sliding barrel carrier 40 which, in addition to its sliding movement, has a lifting movement imparted thereto so that barrels or kegs positioned on the same may be shifted from one point to another through the machine to permit the desired cleansing operations thereon. This barrel carrier rests upon rollers 41 carried at the ends of arms 42 on rock shafts 43 and 44; said rock shafts being connected together so that movement imparted to one will be transmitted to the other. When in the raised position, the carrier is moved forwardly by an arm or bar 46 having a roller 47 at one end engaging the end of said carrier; said arm having rack teeth on its underside whereby it may be moved back and forth by a gear wheel 48 meshing therewith.

Pivoted at 50 to the rear end of the sliding carrier 40, is a barrel lifting device comprising a lever-like structure 51 adapted to receive a barrel from a suitable runway, (not shown), and movement being imparted to this lever-like structure by suitable means, the barrel or keg upon the same will be elevated and deposited upon a seat formed by a plurality of suitable rolls 52 and 53, carried by spindles or shafts having the pinions 24, 24$^a$ and 28, 28$^a$, of the gearing before referred to; said rolls being driven by such gearing. This lever-like structure is pivotally connected to the sliding barrel carrier so as to be raised with it, and the ends of this lever-like structure are provided with rollers 54 for engagement with a fixed cam guide 55 having an inclined surface 56 so that as the carrier is moved forward the lever structure is elevated into proper position to deliver a keg or barrel to said first set of rolls 52 and 53.

As is well known, all kegs are provided with bung-holes disposed in one of the staves of the same and generally disposed at the center thereof. Arranged to enter the bung-hole of a keg when mounted on the rolls 52 and 53, I have provided a nozzle 60 for delivering hot water. This nozzle is pivotally mounted at 61 to the barrel carrier 40, and provided with a spring 62 so that it may be automatically raised into the bung-hole of a barrel when the latter comes into registry therewith. During the rotation of the keg or barrel prior to the time the bung-hole comes into registry therewith, such nozzle contacts with the keg or barrel, and while in this position the flow of hot water is cut off. As soon as the nozzle enters the barrel, however, the latter stops rotating; being held by the nozzle which is automatically lifted into the barrel by the action of the spring 62 and by such rise effects the operation of a valve 63, permitting the flow of hot water into said keg or barrel. To accomplish this result, the valve stem 64 is in engagement with one end of a bell-crank lever 65, the opposite end of said lever having a roller 66 which contacts with the barrel when the nozzle enters the bung-hole and the movement is transmitted to the valve-stem to open the valve.

The mechanism controlling the operation of the apparatus is so timed that the barrel remains in this position, receiving a supply of hot water for a predetermined length of time, which, of course, may differ to take care of differing conditions. This water may be supplied from any suitable source; a hose 67 being suitably connected to the nozzle. In addition hot water is sprayed upon the keg or barrel during the time it is rotating upon the rolls 52 and 53; while it is being internally rinsed, and while it is passing from the first to the second position for external washing. This water is discharged from a pipe 68 connected by means of a hose 69 with a suitable source of supply.

When the end of this part of the washing treatment is reached, the barrel is automatically lifted by the sliding carrier and delivered to a second position adjacent a series of brushes 71 for external scrubbing; the seat for the barrel in this position being formed by driven rollers 72 which are of such a character as to positively rotate the barrel in contact with said brushes so that it will be scrubbed during the rotation. These brushes, which have been raised out of the way with the elevation of the sliding carrier, automatically lower with the carrier into contact with the barrel when it reaches the brushing position simultaneously with the lowering of the carrier and the barrel may occupy this position for a predetermined length of time.

The brushes are mounted on frames 73, adapted to slide in supports 74 having diagonally disposed slots or grooves 75 for the reception thereof, in which slots or grooves racks 76 and pinions 77 are provided so that said brush frames may be adjusted with respect to the supports 74 depending upon the size of the barrels or kegs. The angle of these supports and slots is such that the brushes will lower properly into contact with various sized kegs or barrels usually employed in the packaging of beer, ale, and similar malt liquors. Centering means are carried by and movable with the sliding frames 73, comprising guards or side pieces 78, which may be apertured for the reception and passage of other brushes 79 also mounted on the frames 73 and designed to engage the heads or ends of the keg or barrel.

The brushes which engage the bilge of the keg or barrel are carried by spring supported arms 80 so as to have a desired yielding action in engaging the keg or barrel and the brushes engaging the ends of the barrel are also spring supported in frames 81 for the same purpose, and during the brushing action, both upon the bilge as well as the ends of the keg or barrel, water is discharged thereon from perforated pipes 82 disposed adjacent the brushes. The brushes 71 and 79 of each set at the opposite sides of the machine have a constantly fixed or invariable position with relation to each other, i. e., are not adjustable toward and from each other in the adjustment of the frames 73, the inclination of which is such as to center the brushes without relative movements for different sized kegs as the frames 73 are raised or lowered, thus insuring the accurate relative positioning of the brushes at all times and avoiding the loss of time in bringing the brushes to working position in structures where the brushes have relative movements in their adjustments.

To raise and lower the brush carrying frames, I provide a system of chain gearing. The pinions 77 for moving the frames by engagement with the racks 76 are mounted on shafts or spindles 83, carrying chain wheels 84 and 84$^a$ and disposed between the brush-carrying-frame supports 74 is a frame 85 for the chain gearing. At the top of this frame is a pair of chain wheels 86 and 87 on a shaft or spindle 87$^a$. Between one of the chain wheels 84 and the chain wheel 86, a chain 88 extends. On the other side of this frame 85 the operating means for the chain gearing is placed. For this purpose I provide a pair of shafts or spindles 89 and 90, each carrying a pinion and chain wheel 91, 92, 93 and 94 respectively. The pinions are in mesh so that movement applied to the pinion 91 mounted on the shaft or spindle 89 from a hand wheel 95 would effect movement of the pinion 93, and both chain wheels 92 and 94. Between the chain wheel 92 and the chain wheel 87 a chain 96 extends and between the chain wheel 94 and the chain wheel 84$^a$, a chain 97 extends, and by this means, upon turning the hand wheel 95, the brush frames may be raised and lowered.

The pipes 82 are carried up and down with them.

The brush frames which are set diagonally with respect to the frame of the machine are adjustable up and down by the means just described and they carry the centering means for the kegs so that when the latter are introduced into the machine the bung-holes of the same will be centrally disposed ready for the reception of the nozzles when brought into registry therewith. These guiding or centering means are apertured for the passage of the side brushes designed to act upon the ends of the kegs or barrels, as above described.

After the barrel has been scrubbed externally, it is moved by the carrier to a third position for an internal application of water; a discharge nozzle 100 therefor being mounted in a fixed position but carried by a swinging support in substantially the same manner as the nozzle for the hot water, and the barrel being centered over the same, it is rotated by means of suitable rolls 101 until the bung-hole registers with said nozzle, and when the latter enters said opening, the valve being simultaneously opened in the manner before described, a charge of water, preferably cold, will pass into the barrel. From this position, the barrel may be finally transferred by the sliding carrier, and then removed on a suitable runway (not shown), which receives it when the said sliding carrier is lowered and retracted for engagement with other barrels.

It will be understood, of course, that after the machine is in operation four barrels are being taken care of simultaneously constantly; that is to say, one barrel is being washed internally and externally with the hot water; the second barrel is being externally scrubbed, while the third barrel is being rinsed internally with water.

The sliding carrier has a continuous movement; first up, then forward, then down, then rearward between the several sets of rollers, and when the machine is in complete operation, it is moving the four kegs or barrels at one time.

The swinging support comprising the piping pivotally mounted at 61 and carrying the nozzle 60, has a roller 110 disposed below the pivotal point, which roller is in position to engage a stop 111 suitably fixed to the element 55; such engagement shifting the position of said swinging support so that the nozzle may be removed from the bung-hole and occurring when the sliding carrier has moved forward to shift the positions of the kegs or barrels. When the sliding carrier has moved back, after the barrel has been deposited upon the second set of driving and supporting rolls, the roller 110 is released from contact with the stop 111 and the nozzle will be returned to its normal position by the spring 62 ready to enter the bung-hole of the next keg or barrel. The movement of the nozzle effected by the action of the stop 111 does not affect the flow of water through the valve.

As noted before, the gear wheel 15 carries the camming elements 16$^a$ and 16$^b$ on opposite sides thereof. The cam 16$^a$ on the forward side serves to operate the sliding carrier back and forth through the medium of the rack rod 46 and the gear wheel 48 meshing therewith. To accomplish this, I pivot at 115 a gear segment 116 having a rack surface 117 meshing with a pinion 118 on a shaft 119 carrying the gear wheel 48 in engagement with the rack rod 46, and this cam is of such a character that continuous movement of said gear wheel 15 will first cause the rack to move outward, carrying with it the slidable barrel carrier or conveyer while in an elevated position, and the second movement will carry said rack rod inward after the barrel conveyer has been lowered, restoring the latter to the original position.

The opposite side of the gear wheel 15 carries the cam 16b for effecting the raising and lowering of the barrel conveyer. The rock shaft 43, mounted in the frame 1 of the machine, has an arm 120 with a roller 121 disposed in the groove of this cam, and a pair of arms 42 carrying rollers 41 upon which the barrel conveyer may move. The rock shaft 44 is also provided with arms 42 carrying rollers 41. The rock shafts have arms 122 connected by a link 123 so that movement imparted by the cam 16b will be transmitted to both rock shafts simultaneously so as to effect uniform movement of the arms 42 and insure that the barrel conveyer will be raised and lowered in horizontal planes. Movement of the roller 121 due to the cam 16b will shift said arms 42 so as to turn the rock shafts in their bearings, raising and lowering the barrel conveyer. When raised to the full height the conveyer will be moved forward by the pinion 48 engaging the rack 46; said pinion being driven by the gear segment 116, and when lowered the conveyer will be retracted by the same means up on the reverse movement of said gear segment. The roller 47 on the rack rod is adapted to a guide slot 124 in a bracket 125 carried by the barrel conveyer, whereby up and down motion of said conveyer is permitted without interference from the rack rod.

The movement of the rock shaft 43 connected to the arm 120 directly controlled by the cam 16b is transmitted to the rock shaft 44 as described, and this latter rock shaft has arms 127 with guide slots 128 at their outer ends for the passage of rods or arms 129 depending from the brush carrying frame; said rods or arms having collars 130 whereby when said arms 127 are lifted by the movement of the rock shaft in the elevation of the barrel conveyer, they will engage said collars and lift the brush frames clear of the barrels so that the conveyer with a fresh barrel may be re-positioned with respect to said brushes without contact therewith. This action is preferably assisted by counterbalance weights 131 carried by cords 132 passing over pulleys 133.

A particular feature of my improved machine is the open frame, and arrangement of the barrel conveyer down between the companion pairs of rollers 52, 53, 72 and 101, which is particularly desirable because of the amount of water passing over the machine during the washing operation whereby the water is allowed to drain off with facility without collecting in the machine, and because of the desirability of having room for the barrels and the barrel conveyer to operate in; making the mechanism much simpler and avoiding the annoyance and difficulty of proper handling and replacing worn rollers that would be present were crossing shafts present in the machine.

The operation of my improved machine is as follows:—

The barrel carrier receives the barrels from a suitable conveyer which delivers them to the pivotally mounted lifting skid 51 at the receiving end; said skid being in the lowered position when the carrier is in the lowered position. Prior to the forward movement of the carrier, the latter is raised and with it the skid; then it is moved forward, the skid turning during such movement and when the carrier reaches the limit of its forward movement the skid has completed its lifting movement and the barrel carried thereby is directly over the first set of rolls 52 and 53. The carrier is now lowered; the barrels dropping onto said rolls, and after the carrier is lowered it is moved back and when fully retracted the skid is in the lowered position ready to receive another barrel. The barrel on the rolls 52 and 53 is turned by them until the bung hole is brought into registry with the nozzle delivering hot water (and in some instances steam); said nozzle being so positioned as to readily enter said bung-hole as the barrel turns. When the nozzle enters the bunghole, it stops the rotation of the barrel. A fresh barrel is now delivered to the skid, and the same operation is repeated; the carrier in rising picking up the barrel from the rolls 52 and 53 and when it is moved to the limit of its forward movement said barrel has been carried to its position beneath the brushes. In like manner successive barrels are moved forward step-by-step; first to the nozzle 60; then to the brushes; then to the cold water nozzle; and finally to a position where they may be discharged from the carrier.

I claim:—

1. In a barrel washing machine, the combination of a frame, downwardly and inwardly inclined brush frame guides at the opposite sides of the frame, gravity actuated brush frames slidably mounted upon said guides, bilge brushes carried by said frames and movable through the sliding motions of said frames on converging lines into working position and on diverging lines out of working position, vertically reciprocating members for lifting and retracting said brush frames, and rocking elements actuated at timed intervals by the running gear of the machine for raising said vertically reciprocating members and thereafter permitting the descent thereof, said rocking elements having a sliding lost-motion connection with said members.

2. In a barrel washing machine the combination of a frame, downwardly and inwardly inclined brush frame supports at the opposite sides of the frame, gravity actuated brush frames slidably mounted upon said frame supports, brushes carried by said frames and movable on converging lines into working position and on divergent lines out of working position, means actuated by the running gearing of the machine for periodically permitting said brush frames to move by gravity into working position and for subsequently raising and retracting said brush frames, rack and pinion mechanism for adjusting the brush frames to vary their positions upon the frame supports, and means for operating the rack and pinion mechanisms of the sets of brushes in unison.

3. In a barrel washing machine, the combination of a frame, downwardly and inwardly inclined brush frame supports at the opposite sides of the frame, gravity actuated brush frames slidably mounted upon said frame supports, brushes carried by said frames and movable on converging lines into working position and on diverging lines out of working position, vertically movable rods for raising and retracting the brush frames, and vertically movable rocker levers actuated by the running gearing of the machine and having a sliding lost-motion connection with the rods for raising said rods at predetermined intervals and subsequently permitting lowering motion of the rods.

4. In a barrel washing machine, the combination of a frame, downwardly and inwardly inclined brush frame supports at the opposite sides of the frame, gravity operated brush frames slidably mounted upon said frame supports, bilge brushes carried by said frames and movable on converging lines into working position and on diverging lines out of working position, longitudinally extending centering devices carried by and movable with said brush frames, end brushes carried by and movable with said centering devices, and a vertically and longitudinally movable barrel conveyer, and means including rocker mechanism actuated by the running gear of the machine for raising and lowering the conveyer and effecting movements of the brush carrier frames at timed intervals.

5. In a barrel washing machine, the combination of a frame, downwardly and inwardly inclined brush frame supports at the opposite sides of the frame, gravity actuated brush frames slidably mounted upon said frame supports, brushes carried by said frames and movable on converging lines into working position and on diverging lines out of working position, means actuated by the running gearing of the machine for periodically permitting said brush frames to move by gravity into working position and for subsequently raising and retracting said brush frames, adjusting devices for adjusting the brush frames to vary their positions upon the frame supports, and means for actuating the adjusting devices of the brushes in unison.

6. In a barrel washing machine, a frame, sets of brushes at each side of the frame movable out of working position on relatively diverging lines and into working position on relatively converging lines, each set of brushes comprising bilge and end brushes yieldingly mounted but having a constantly fixed relationship, centering devices movable with the sets of brushes and carrying said end brushes, and means for adjusting the sets of brushes and centering devices into and out of working positions.

7. In a barrel washing machine, the combination of a frame, guides at opposite sides of the frame, barrel supporting devices upon the frame on opposite sides of the guides, sets of brushes mounted upon the respective guides for adjustment to different positions for different sized barrels, barrel centering devices at opposite sides of the frame and connected with the brushes for movement therewith, said centering devices extending over the frame beyond the guides for coaction with the several barrel supporting devices, a barrel conveyer, means for operating the working parts, and means for adjusting the sets of brushes and centering devices in unison.

8. In a barrel washing machine, the combination of a frame, downwardly and inwardly inclined brush frame supports at the opposite sides of the frame, brush frames slidably mounted upon said frame supports, bilge brushes carried by said frames and movable on convergent lines into working position and on divergent lines out of working position, longitudinally extending centering devices carried by and movable with said brush frames, end brushes carried by and movable with said centering devices, and means for operating said brush frames to project and retract the brushes and centering devices at timed periods.

9. In a barrel washing machine, the combination of a frame, downwardly and inwardly inclined brush frame supports at the opposite sides of the frame, gravity operated brush frames slidably mounted upon said frame supports, bilge brushes carried by said frames and movable on convergent lines into working position and on divergent lines out of working position, longitudinally extending centering devices carried by and movable with said brush frames, end brushes carried by and movable with said centering devices, means operated by the running gearing of the machine for sliding the brush frames to retract the brushes and centering devices at timed intervals, and means operative independently of the first-named means for varying the positions of the frames upon the supports.

10. In a barrel washing machine, the combination of a frame, an upwardly and forwardly and downwardly and rearwardly movable conveyer, downwardly and inwardly inclined brush frame supports at the opposite sides of the frame, brush frames slidably mounted upon said frame supports, bilge brushes carried by said frames and movable on convergent lines into working position and on divergent lines out of working position, longitudinally extending centering devices carried by and movable with said brush frames, rotatable barrel supports, means actuated by the running gear of the machine for longitudinally reciprocating the conveyer, means including rocker mechanism actuated by the running gear of the machine for raising and lowering the conveyer, and lost-motion connections governed by the second-named means for actuating the brush carrier frames at timed intervals.

In testimony whereof I affix my signature in presence of two witnesses.

CHARLES B. VAN HORN.

Witnesses:
HELEN G. DALEY,
NORMAN J. SMITH.

Copies of this patent may be obtained for five cents each, by addressing the "Commissioner of Patents, Washington, D. C."